US008540502B2

(12) United States Patent  (10) Patent No.: US 8,540,502 B2
Chen  (45) Date of Patent: Sep. 24, 2013

(54) ADJUSTABLE SHOE MOLD SET

(76) Inventor: Ming Te Chen, Taichung Hsien (TW)

( * ) Notice: Subject to any disclaimer, the term of this patent is extended or adjusted under 35 U.S.C. 154(b) by 272 days.

(21) Appl. No.: 13/004,939

(22) Filed: Jan. 12, 2011

(65) Prior Publication Data

US 2011/0177186 A1  Jul. 21, 2011

Related U.S. Application Data

(60) Provisional application No. 61/296,027, filed on Jan. 19, 2010.

(51) Int. Cl.
*A43D 3/12* (2006.01)

(52) U.S. Cl.
USPC .............. 425/119; 425/129.2; 264/244; 12/7; 12/15; 12/15.1; 12/107 R; 12/126

(58) Field of Classification Search
USPC ................ 425/119, 129.2; 264/244; 12/1 F, 12/1 R, 1 W, 7, 15, 15.1, 107 R, 126, 133 R, 12/136 R
See application file for complete search history.

(56) References Cited

U.S. PATENT DOCUMENTS

| 117,582 | A | * | 8/1871 | Webb, Jr. ........................ 12/126 |
| 124,908 | A | * | 3/1872 | Morton ........................... 12/126 |
| 774,865 | A | * | 11/1904 | Butterfield ..................... 425/119 |
| 1,920,281 | A | * | 8/1933 | Standish ......................... 12/126 |
| 2,830,324 | A | * | 4/1958 | Farmer et al. ................. 425/119 |
| 3,016,569 | A | * | 1/1962 | Bingham, Jr. et al. ........ 425/119 |
| 4,575,889 | A | * | 3/1986 | Roseland et al. ................. 12/15 |

* cited by examiner

*Primary Examiner* — Timothy Kennedy

(57) ABSTRACT

A shoe mold set includes a mold, a movable block and an adjustment unit. The mold is connected to the movable block, and both are slidably between two rail members of the replacement unit. The replacement unit is connected with the adjustment unit which is adjustably located between the top board and the bottom board of the replacement unit. The mold is micro-adjustable by operation of the adjustment unit.

11 Claims, 3 Drawing Sheets

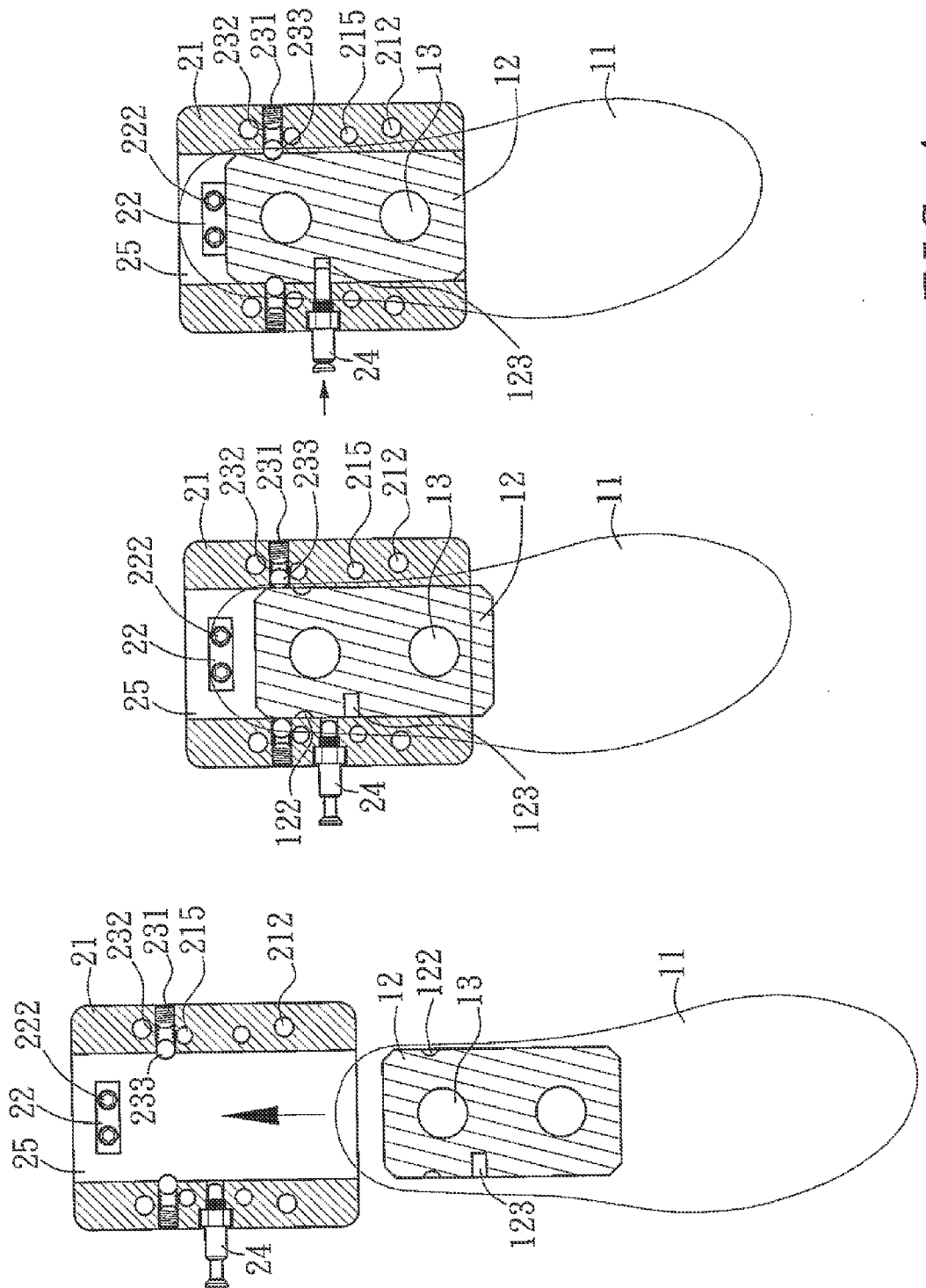

ADJUSTABLE SHOE MOLD SET

FIELD OF THE INVENTION

The present invention relates to a shoe mold, and more particularly, to a shoe mold set which allows the mold to be easily adjusted and replaced.

BACKGROUND OF THE INVENTION

A conventional shoe mold is fixed to the circular disk of the shoe making machine and the mold is not adjustable. After all of the required amount of shoes are made, the mold is removed from the circular disk and another mold having different size and/or type mold is locked to the circular disk again so as to make another size and/or type shoes. However, it requires a lot of time to remove the mold on the circular disk and production line has to be stopped until another mold is locked on the circular disk. The efficiency of time-control is worse.

The mold may be installed to the circular disk no in the proper way so that the shoes cannot be made accurately as design. The conventional shoe mold cannot be adjusted once it is locked so that the shoes made according to the mold may not meet the requirements and this may cause significant loss of material, time and money.

The present invention intends to provide a shoe mold set wherein the shoe mold is easily set and can be micro-adjusted.

SUMMARY OF THE INVENTION

The present invention relates to a shoe mold set and comprises a mold and a movable block. A replacement unit includes two rail members which is connected to two sides of a top board. An adjustment unit is connected between the top board and a bottom board. The adjustment unit includes a first rod, a second rod and an adjustment member. The first and second rods are threadedly and respectively connected to a first hole of the top board and a second hole of the bottom board. The adjustment member is threadedly connected between the first and second rods.

The primary object of the present invention is to provide a shoe mold set which includes an adjustment unit connected between the top and bottom boards, and the mold is slidably connected to two rail members connected to two sides of the top board. By operation of the adjustment unit, the mold can be micro-adjusted when needed.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 shows that the shoe mold and the movable member are to be slid into the space between the two rail members of the replacement unit of the shoe mold set of the present invention;

FIG. 3 shows that the shoe mold and the movable member are slid into the space between the two rail members of the replacement unit of the shoe mold set of the present invention;

FIG. 4 shows that the shoe mold and the movable member are slid into the space between the two rail members of the replacement unit of the shoe mold set of the present invention, and the movable member is positioned by the positioning units and the engaging pin;

DETAILED DESCRIPTION OF THE PREFERRED EMBODIMENT

Figure 1:
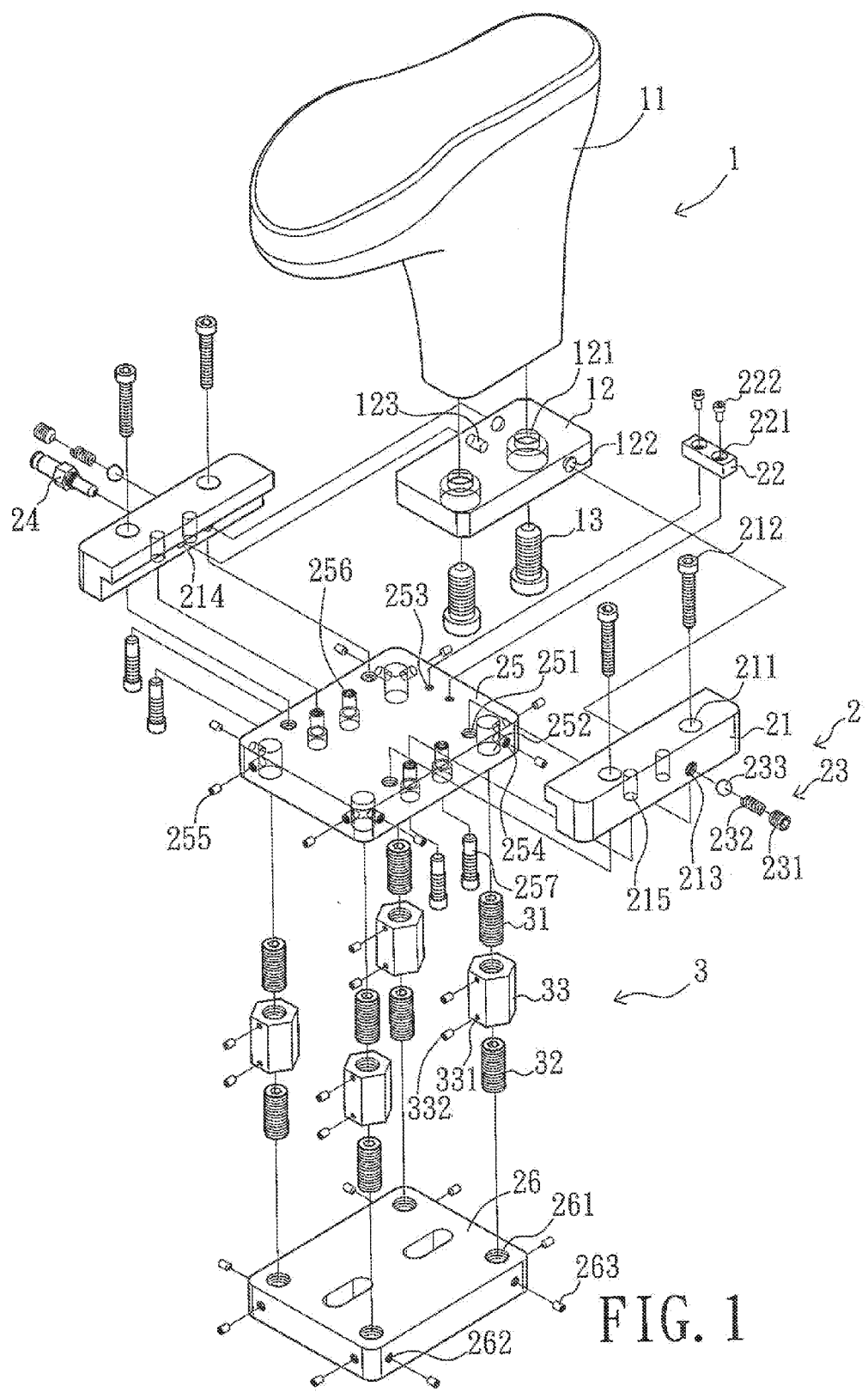
FIG. 1 is an exploded view to show the shoe mold set of the present invention.

Referring to FIGS. 1 to 6, the shoe mold set 1 of the present invention comprises a mold 11 and a movable block 12, wherein the movable block 12 includes two holes 121 and the bolts 13 extend through the holes 121 to fix the mold 11 and the movable member 12. Two notches 122 are respectively defined in two sides of the movable block 12 and a side hole 123 is defined in one of the two sides of the movable block 12. The notches 122 are engaged with the bead 233 of the replacement unit 2 and the side hole 123 is engaged with an engaging pin 24, so as to position the movable block 12 to the replacement unit 2.

The replacement unit includes two rail members 21, a top board 25 and a bottom board 26. The top and bottom boards 25, 26 are connected with an adjustment unit 3. The rail members 21 each are an L-shaped member and fixed to the two sides of the top board 25 by extending bolts 212 extending through the threaded holes 211 of the rail members 21 and fixed to the top board 25. Each rail member 21 includes multiple fixing holes 215 defined in an underside thereof. The two rail members 21 define a slot on the top of the top board 25 so that the movable block 12 is slidably received in the slot. The replacement block 12 includes a stop member 22 connected thereto and the stop member 22 includes two passages 221 and two pins 222 extend through the passages 221 and fix the stop member 22 on the top board 25. The two movable members 21 each have a through hole 213 and one of the movable members 21 has a path 214 defined therethrough. Two positioning units 23 are respectively located in the two through holes 213 and an engaging pin 214 extends through the path 214. Each positioning unit 23 includes an end piece 231, a resilient member 232 and a bead 21. A part of the bead 232 protrudes out from the inside of the movable member 21 corresponding thereto and the engaging pin 24 is movable in the path 214.

The adjustment unit 3 is threadedly connected between the top and bottom boards 25, 26. The top board 25 includes threaded holes 251, first holes 252, pin holes 253 and positioning holes 256. The threaded holes 251 are located in alignment with the threaded holes 211 so that bolts 212 extending through the threaded hole 211 and fixed to the threaded holes 251 to fix the rail members 21 to the top board 25. The first rods 31 are threadedly connected to the first holes 252 and the passages 221 of the stop member 22 are in alignment with the pin holes 253, and the pins 222 extend through the passages 221 of the stop member 22 and the pin holes 253 to fix the stop member 22 on the top board 25. The positioning pins 257 extend through the positioning holes 256 and are engaged with the fixing holes 215 of the rail members 21 to fix the rail members 21 on the top board 25. The top board 25 further has first contacting holes 254 in four sides thereof and first pieces 255 are received in the first contacting holes 254 to contact against the side of the first rods 31 so as to position the first rods 31 relative to the top board 25.

The bottom board 26 includes second holes 261 located in alignment with the first holes 252 of the top board 25 and the second rods 32 threadedly connected to the second holes 261.

The bottom board 26 further includes second contacting holes 262 defined in four sides thereof and second pieces 263 are received in the second contacting holes 262 so as to contact against the side of the second rods 32 and to position the second rods 32 relative to the bottom board 26.

The adjustment unit 3 includes the first and second rods 31, 32 and the adjustment member 33. The first rods 31 are connected between the first holes 252 of the top board 25 and the adjustment member 33. The second rods 32 are connected between the second holes 261 of the bottom board 26 and the adjustment member 33. The adjustment members 33 each have side apertures 331 and the fixing members 332 are located in the side apertures 331 to position the adjustment unit 3.

When installing the shoe mold 11 which is connected to the movable block 12, the movable block 12 is slid into the space between the two rail members 21 until the beads 233 are engaged with the notches 122 of the movable block 12. The engaging pin 24 is then pushed into the side hole 123 of the movable block 12 to fix the mold 11.

When pouring process is completed, the material needs time to cool down, the shoe mold 11 needs to be removed and another shoe mold 11 is installed to the replacement unit 2. The worker needs only to pull the engaging pin 24 from the side hole 123 and pulls the mold 11 and the movable block 12 to retract the beads 233 which compress the resilient members 232. The mold 11 and the movable block 12 are easily removed, and another set of the mold 11 and the movable block 12 can be installed.

Figure 5:
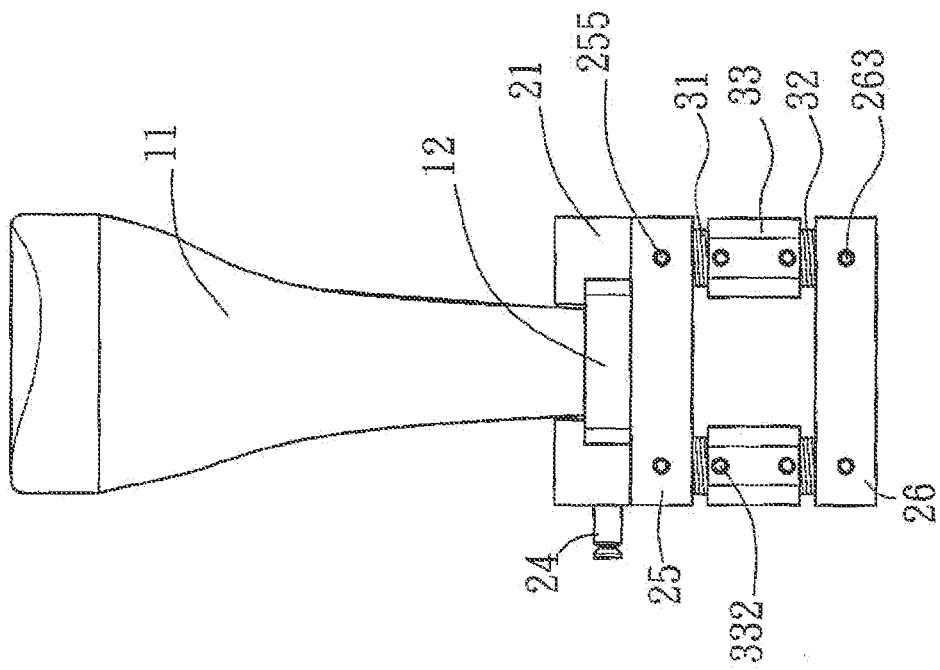
FIG. 5 shows that the shoe mold and the movable member are slightly tilt and need to be adjusted.
Figure 6:
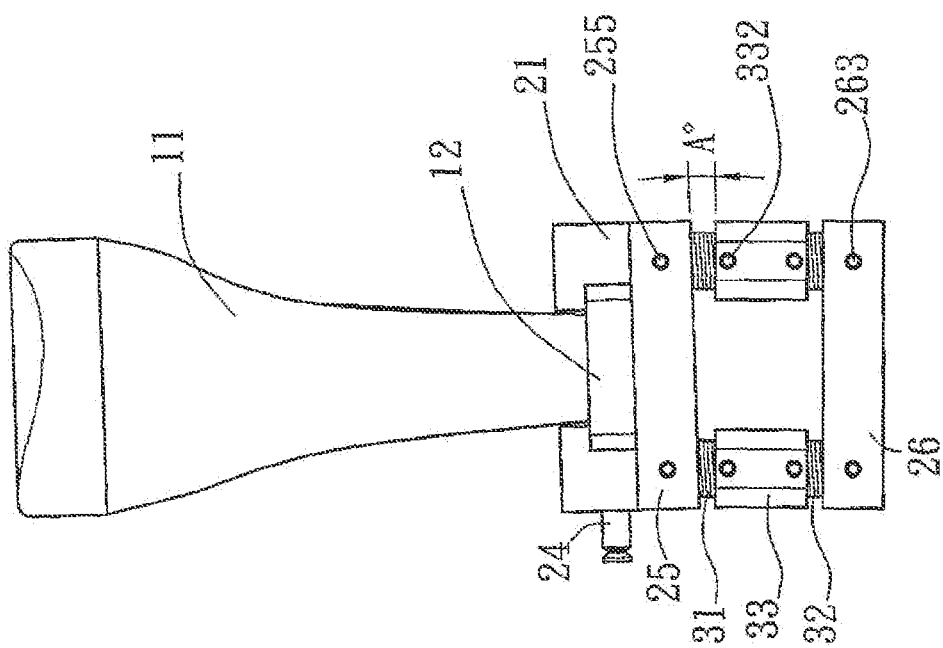
FIG. 6 shows that the shoe mold and the movable member are adjusted by operation of the adjustment unit.

When the shoe mold 11 is found to be installed improperly, such as the shoe mold 11 tilts, or the left and right shoe molds do not have the same depth. The worker calculates the adjustment values and operates the adjustment members 33 as shown in FIGS. 5 and 6, until the shoe mold 11 is set to desired position, the fixing members 332 are operated to fix the first and second rods 31, 32 in the adjustment members 33 to correct the position of the shoe mold 11.

When the rail members 21 need to be replaced, the rail members 21 are easily removed from the top board 25 by using simple tools and new rail members 21 can easily installed.

The mold 11 and the movable block 12 can also be integrally formed with each other. The stop member 22 can also be integrally formed on the top board 25. The replacement unit 2 and the top board 25 can be integrally formed with each other.

While we have shown and described the embodiment in accordance with the present invention, it should be clear to those skilled in the art that further embodiments may be made without departing from the scope of the present invention.

What is claimed is:

1. A shoe mold set comprising:
    a mold and a movable block;
    a replacement unit including two rail members, a top board and a bottom board, the top and bottom boards being connected with an adjustment unit, and
    the adjustment unit having a first rod, a second rod and an adjustment member, the first and second rods being threadedly and respectively connected to a first hole of the top board and a second hole of the bottom board, the adjustment member being threadedly connected between the first and second rods, wherein the top board is between the movable block and the bottom board.

2. The shoe mold set as claimed in claim 1, wherein the mold and the movable block are integrally formed with each other.

3. The shoe mold set as claimed in claim 1, wherein the movable block includes a notch and a side hole.

4. The shoe mold set as claimed in claim 1, wherein the replacement unit includes a stop member connected thereto.

5. The shoe mold set as claimed in claim 4, wherein the stop member is integrally formed on the top board, or connected to the top board.

6. The shoe mold set as claimed in claim1, wherein the two adjustment members each have a through hole and one of the movable members has a path defined therethrough, two positioning units are respectively located in the two through holes and an engaging pin extends through the path.

7. The shoe mold set as claimed in claim 1, wherein the rail members and the top board are integrally formed with each other, or the replacement unit is connected to the top board.

8. The shoe mold set as claimed in claim 1, further including a location mechanism comprising positioning pins extending through positioning holes and engaged with fixing holes of the rail members to fix the rail members on the top board.

9. The shoe mold set as claimed in claim 1, wherein the top board includes a first contacting hole defined therein and a first piece is received in the first contacting hole so as to position the first rod.

10. The shoe mold set as claimed in claim 1, wherein the bottom board includes a second contacting hole defined therein and a second piece is received in the second contacting hole so as to position the second rod.

11. The shoe mold set as claimed in claim 1, wherein the adjustment member includes side apertures and fixing members are located in the side apertures to position the adjustment unit.

* * * * *